United States Patent [19]
Roemmele et al.

[11] Patent Number: 4,550,708
[45] Date of Patent: Nov. 5, 1985

[54] ABRASIVE CUTTING WHEEL FOR CUTTING ROCK-LIKE MATERIAL

[75] Inventors: Carl F. Roemmele, Leawood, Kans.; Joseph D. Ekland, Birmingham, Mich.

[73] Assignee: Federal-Mogul Corporation, Southfield, Mich.

[21] Appl. No.: 510,439

[22] Filed: Jul. 6, 1983

[51] Int. Cl.$^4$ ............................................. B28D 1/04
[52] U.S. Cl. .................................... 125/15; 51/206 R
[58] Field of Search ......................... 51/206 R, 206 P; 125/15, 14

[56] References Cited

U.S. PATENT DOCUMENTS

| | | | |
|---|---|---|---|
| 1,156,166 | 10/1915 | Meyers | 125/15 |
| 1,614,225 | 1/1927 | Buth | 51/206 P |
| 2,502,043 | 3/1950 | Howard | 125/14 |
| 3,128,755 | 4/1964 | Benson | 51/206 R |
| 4,067,311 | 1/1978 | Benetello | 125/15 |
| 4,345,579 | 8/1982 | Eichenlaub | 125/15 |

FOREIGN PATENT DOCUMENTS

| | | | |
|---|---|---|---|
| 266235 | 2/1927 | United Kingdom | 125/15 |
| 403159 | 12/1933 | United Kingdom | 51/206 P |

*Primary Examiner*—Harold D. Whitehead
*Attorney, Agent, or Firm*—Robert F. Hess; Lawrence J. Shurupoff

[57] ABSTRACT

A circular cutting wheel is disclosed and has a plurality of diamond-bearing arcuately shaped cutting members bonded to the periphery thereof and a generally U-shaped gullet between each pair of adjacent cutting members, wherein preferably the arc length of each cutting member at its radial extremity is approximately equal to the arc length of an adjacent gullet at its radial extremity, thereby providing the means with which to circulate fluid coolant to the cutting members at the point the cut is being made and to discharge the swarf from that same point to an area away from the cutting wheel.

23 Claims, 4 Drawing Figures

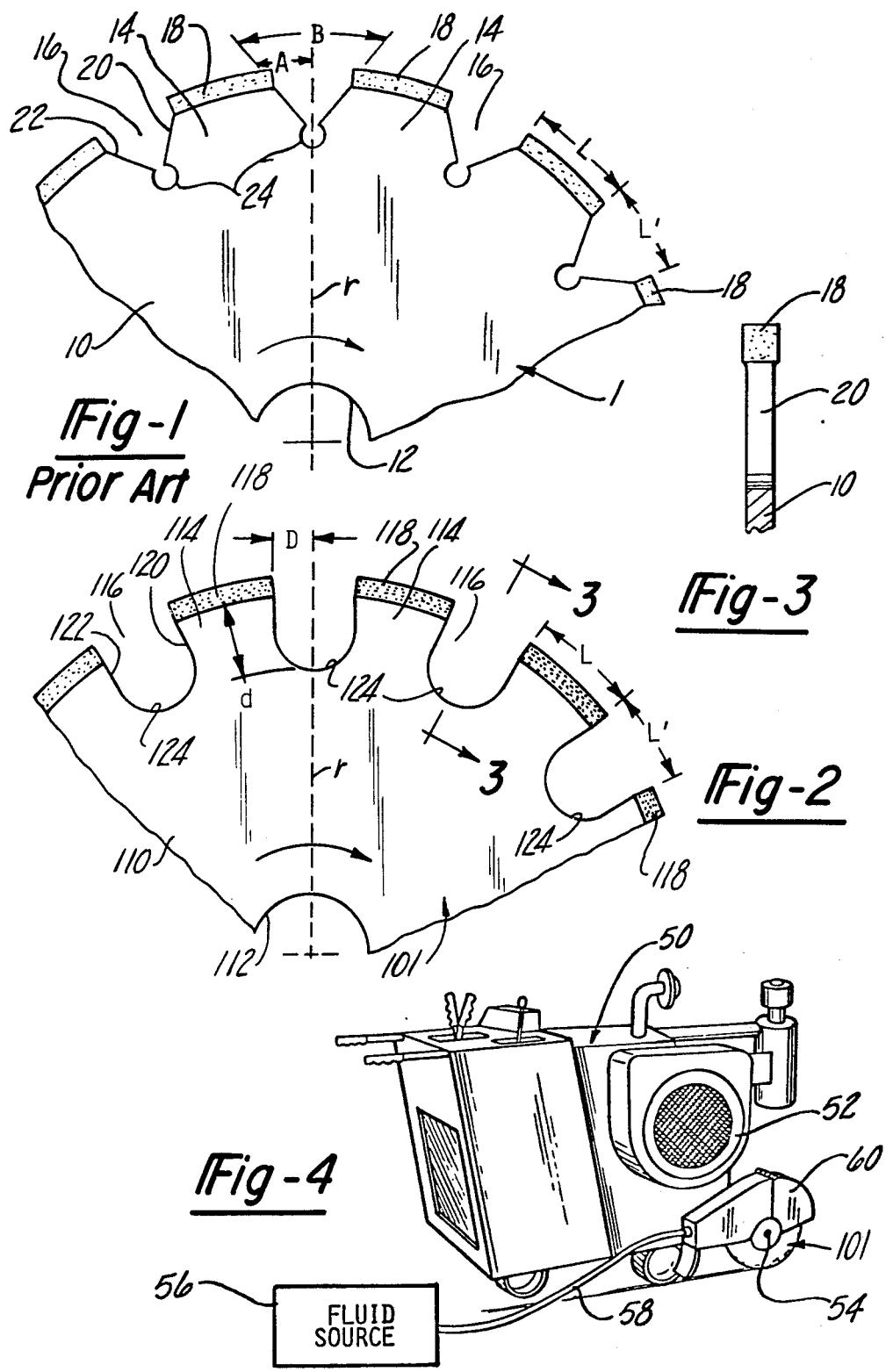

ABRASIVE CUTTING WHEEL FOR CUTTING ROCK-LIKE MATERIAL

CROSS-REFERENCE TO RELATED APPLICATIONS

Reference is made to the copending patent application of Paul B. Ballenger, Ser. No. 403,200, filed on July 29, 1982 and now abandoned and assigned to the same assignee as the assignee of the present application. The disclosure of said copending application, Ser. No. 403,200, is incorporated by reference herein.

BACKGROUND OF THE INVENTION

The present invention relates to abrasive saw blades or cutting wheels and, most specifically to saw blades of the type formed by a strong, circular sheet metal drive core having one or more cutting members containing dispersed diamond dust secured around its periphery by a metallic bond and suitable for serious industrial applications.

Diamond abrasive saws of the metallic bonded variety have been classicially divided into three distinct groups, all of which are well known in the trade at the present time. The first of these groups is the serrated or notched rim type blade, which is old in the art and is probably the earliest concept of the diamond cutting disc or saw. This type of blade is made by notching or slitting a disc of steel or copper and inserting into these fine hacks a paste of diamond grit and a holding material like petroleum jelly or, more recently, various metal powders. The notched rim type of saw has the merit of being reasonably indestructible, but it cuts so poorly that it has no real acceptance in any serious industrial applications, although it is satisfactory in the case of the lowest priced blades which are used in home hobby-type operations such as the lapidary avocation.

The second group of saw blades consists of a cutting disc having around its periphery a continuous annulus of compressed and matured metallic powder containing diamond dust. This blade has been traditionally made by cold molding the metal powder and diamond dust annulus around a steel body and sintering or otherwise maturing the annulus to a sufficient strength to hold the diamond dust well and to cut freely. This type of blade is functionally superior over the first mentioned group of blades, but it too is unsatisfactory for serious industrial applications since it has the disadvantage of being physically frail due to the delicate nature of the bond between the annulus and the core. Various mechanical devices have been proposed to improve the bond, but in general due to the shortcomings of the manufacturing method, the cutting disc so made is fragile. Its use is confined in large part to precision operations such as germanium cutting, optical glass cutting, and other such uses that fall more or less into the instrument making classes.

The third and relatively recent group of saw blades is the discontinuous rim or segmental type. This cutting disc is made by manufacturing a series of short arcuate segments containing diamond powder in a metallic body. These segments are usually about 2 inches long and are ordinarily silver soldered, brazed or welded to the rim of a steel core which has been divided into sections of approximately the segment length by chopping or sawing the rim radially. Without these discontinuities, the saw disc could not readily be made owing to the great stresses created in the disc by heating only its periphery. The segmented blade has been accepted by those fields that are prone to give the hardest usage to the blades, such as the concrete sawing and masonry cutting field where rough abrasive cutting is done.

For such applications it is common to flush the cutting area continuously during the cutting operation with a fluid coolant in order to keep the blade as cool as possible and to flush from such area loose rock-like material, spent abrasive and the like, all of which in combination with the coolant itself is generally referred to in the art and throughout this description of the present invention as "swarf". Even though the construction of this type of blade has been developed to a high point of perfection, blades must commonly be replaced whenever the swarf erodes the steel drive core at the juncture of the cutting members with the core and thus causes undercutting of the cutting members and possible loss of the cutting members. This is particularly the case in certain types of concrete cutting operations. Prior to the invention of the related application referred to above, little or no thought had been given to the idea of utilizing the blade construction itself to create a more effective means of providing greater cooling of the wheel and delivering coolant to the immediate area or point at which the wheel is making the cut as a means of flushing the swarf from that portion of the cut or cut groove which overlaps the sides of the wheel as the cut is being made.

Another recently developed segmental blade or cutting wheel is that disclosed in the above-referenced copending patent application of Paul B. Ballenger, Ser. No. 403,200, filed on July 29, 1982 and assigned to the same assignee as the present invention, the disclosure of said copending application being incorporated by reference herein. Although such segmental cutting wheel represents a major advancement in the art, the present invention provides even more effective means of cooling the wheel, of delivering coolant to the cutting portion of the wheel, and of flushing the swarf from the portion of the cut that overlaps the sides of the wheel during the cutting operation.

SUMMARY OF THE INVENTION

The present invention generally includes a circular cutting wheel having a plurality of diamond-bearing arcuately shaped cutting members bonded to the periphery of the wheel and a gullet between each pair of adjacent cutting members wherein the arc length of each cutting member at its radial extremity is approximately equal to the open-end length of an adjacent gullet at its radial extremity, thereby providing the means with which to supply fluid coolant to the cutting members at the point the cut is being made and to discharge the swarf from that same point to an area away from the cutting wheel.

At least a substantial number, and preferably all, of the gullets are generally U-shaped, with the radial distance between the open and closed ends of the gullets being approximately equal to the circumferential width of their open ends, thereby defining a fluid passageway having substantial volumetric capacity for circulating substantial amounts of cooling fluid to the cutting area in order to cool the wheel and carry away swarf therefrom.

Accordingly, an object of the invention is to provide a new and improved diamond abrasive cutting wheel of the kind described.

Another object of the invention is to construct a cutting wheel in such manner as to provide an effective means for circulating a fluid coolant.

Another object is to provide a cutting wheel capable of more effectively delivering a fluid coolant to the area being cut by the cutting wheel and to portions of the cutting wheel itself.

Yet another object is to provide a diamond abrasive cutting wheel which uses substantially less diamond material than conventionally constructed cutting wheels but has a cutting speed at least equal to any such conventional cutting wheel.

These and other desirable objects may be attained in the manner disclosed as an illustrative embodiment of the invention in the following description and in the accompanying drawings forming a part hereof.

BRIEF DESCRIPTION OF THE DRAWINGS

FIG. 1 is a fragmentary face view of a cutting wheel according to one example of the prior art.

FIG. 2 is a fragmentary face view of a cutting wheel according to a preferred embodiment of the invention.

FIG. 3 is a fragmentary radial cross section of the cutting wheel of FIG. 2 taken approximately on the line 3—3 thereof through a gullet.

FIG. 4 is a generally schematic perspective view of the cutting system according to a preferred embodiment of the invention.

DESCRIPTION OF THE PREFERRED EMBODIMENTS

FIG. 1 illustrates a diamond abrasive cutting wheel or blade generally designated as 1, which is an example of a cutting wheel incorporating the invention of the above-referenced copending Ballenger application. The illustrated example of said cutting wheel invention generally includes a central sheet metal drive disc or core 10 made of suitable wrought metal, preferably steel, and provided with a central apparatus or arbor hole 12 for mounting the blade on a rotating axially-extending shaft. The periphery of the core is segmented so as to provide a plurality of cutting segments 14 and a gullet 16 between each adjacent pair of cutting segments 14. Upon a base or support surface located at the radially thereat outermost extremity of each cutting segment 14 there is bonded a diamond-bearing cutting element or member 18. As viewed from the face of the saw blade in FIG. 1, the cutting elements are arcuate, and the bases of the cutting segments are circular arcs having the center of the core as their centers of curvature.

The gullets in the illustrated exemplary embodiment of the Ballenger invention in FIG. 1 are bounded by respective side faces 20 and 22 of each adjacent pair of cutting segments 14. Each pair of side faces 20 and 22 forms a gullet, in the exemplary Ballenger wheel, that converges radially inwardly from the base of its respective cutting segment towards an apex. Preferably the gullet is symmetrical about a line r radiating from the center of the blade through the apex such that the angle A between one side face 22 and radial line r is equal to one half of the included angle B between each pair of side faces 20 and 22 forming a respective gullet. It is preferred that angle B be approximately 70°, however other angles could be used. For example, it has been found that the exemplary cutting wheel 1 will function satisfactorily at an angle B greater than 70° provided one does not reach a point where the wheel "hammers" the materials being cut. "Hammering" is the action of a cutting wheel repetitively bouncing off the material surface rather than digging in and cutting it. A drill hole 24 is made approximately at the centerpoint of the apex of each gullet 16 for purposes of relieving stresses which would otherwise be created at a sharp juncture of the side faces 20 and 22.

FIGS. 2 and 3 illustrate an exemplary embodiment of an improved blade or cutting wheel according to the present invention. Similar to the cutting wheel 1 shown in FIG. 1, the cutting wheel 101 generally includes a central sheet metal drive disk or core 110 made of suitable wrought metal, preferably steel, and provided with a central apparatus or arbor hole 112 for mounting the blade on a rotating axially-extending shaft. The periphery of the core is segmented so as to provide a plurality of cutting segments 114 and a gullet 116 between each adjacent pair of cutting segments 114. Upon a base or support surface located at the radial extremity of each cutting segment 114 there is bonded a diamond-bearing cutting element or member 118. The cutting segments thus serve as support surfaces for the cutting elements. The circumferential length of the support surfaces may range from about 1.25 inches to 2.5 inches.

As viewed from the face of the saw blade looking in an axial direction, the cutting elements are arcuate. The bases of the cutting segments are circular arcs having the center of the drive core as their centers of curvature. The cutting members are composed of diamond grit embedded and dispersed in a hard matrix material such as a mixture of bronze and iron. The particular metal mixture mentioned is preferred at the present time, but it should be understood that the scope of the invention covers any suitable hard abrasive grit dispersed in any suitable hard mixture material. As seen in FIG. 2, the cutting members 118 are approxmately rectangular in cross section, (as viewed in a circumferential direction), and have a slightly greater width in an axial direction than the core 110 to extend axially outwardly beyond the surfaces of the core 110 by a small equal amount at either side. The diamond bearing elements or sections 118 are wider than the body of the core 110 to provide clearance during cutting, acting similar to the "set" on a wood or metal cutting saw blade.

Although not shown, the cutting members may overlap the peripheral edge of the core at the bottom edges of the grooves in a radially inward direction to a small extent. This overlapping contributes to the prevention of undercutting during the rotating operation of the saw blade. In the case of continued use of saw blades of the general type herein described, difficulties have been encountered with the drive core being worn out at the region of the arcuate junction of the diamond containing cutting members to the core. This wear is caused by the abrasive action of loose abrading particles on the rotating cutting wheel at this region which sharpens and thins the core at this critical peripheral area. This sharpening and cutting of the metallic periphery of the core may weaken the bonding junction.

The gullets are bounded and defined in part by respective side faces 120 and 122 of each adjacent pair of cutting segments. Each pair of side faces 120 and 122 preferably forms a generally U-shaped gullet with a semi-circular radiused, or other arcuate, face portion 124 at the closed end of the gullet. Preferably the gullet is symmetrical about a line r radiating from the center of the blade through the gullet such that the distance D between one side face 120 and radial line r is generally equal to the distance between the other side face 122 and the radial line r. It is preferred that the side faces 120 and 122 are generally straight lines that are generally parallel to the radius line r and hence to each other. It is also preferred that the gullet depth d, which is the radial distance between the open and closed ends of the gullet, is approximately equal to the arc length L' of the gullet. It should be noted, however, that gullets having somewhat arcuate side faces, for example, merging with the radiused or other arcuate inward portion 124 may also be employed to provide a substantially large volumetric gullet capacity according to the principles of the invention as described herein.

In the preferred embodiment of the present invention, the side faces 120 and 122 are substantially linear and straight in configuration, as mentioned above. It is also preferred that at least at their intersections with the preferably semi-circular arcuate face portions 124, the side faces 120 and 122 are substantially colinear with tangent lines on the respective sides of the face portion 124. Thus in this preferred embodiment, as well as in other embodiments, it is desired that the surfaces of the drive core that define the gullet opening (e.g., the side faces 120 and 122, and the arcuate face portion 124) are substantially continuous with one another and merge together to form a relatively smooth, continuous gullet face in order to substantially minimize the stress concentrations on the drive core during the cutting operation.

In addition to the geometric shape of the gullet, another important criteria to the effective performance of the present invention is that the total peripheral or circumferential length of diamond bearing material, i.e. the total circumferential length of all members 118, should be approximately equal to, or perhaps slightly greater than, the total gullet arc length or circumferential gullet width at the extremities of the wheel. Thus there is afforded a balance between the cutting ability of the diamond bearing members and the substantially large volumetric capacity of the generally U-shaped gullets and thus their ability to circulate fluid to cool the blade and carry away the swarf. Preferably the cutting member arc length L of each cutting member is approximately equal to the arc length L' of each gullet. However, an acceptable approximate range for the ratio of cutting member arc length to gullet arc length is 0.75 to 1.20.

A specific example of an actually-tested version of the preferred embodiment is a cutting wheel having the following specifications:

Blade core diameter: 24½ inches (nominal 24 inch blade)
Blade core material: Steel
Blade core thickness: 0.125 inches
Number of cutting members: 19 (equally spaced)
Cutting member arc length (L): Approx. 2.0 inches
Number of gullets: 19
Gullet arc length (L'): Approx. 2.0 inches (this exact dimension is determined by the other parameters given in this example)
Gullet depth: Approx. 2.0 inches The end result of the testing of a blade constructed as described above in accordance with the preferred embodiment is a blade wherein the gullet (i) provides a substantially large volumetric entrapment of a fluid coolant within the plane of the blade; (ii) pumps or circulates the fluid coolant into and from the cutting area; (iii) exposes a substantial amount of the core to the coolant; (iv) carrys away the swarf from the cutting area each time it passes through the cut; and a blade that has other unexpected superior performance characteristics.

In use, as shown in FIG. 4, the cutting wheel 101 according to the present invention is mounted on the drive arbor shaft of a saw 50. The saw includes a motor generally shown at 52 for driving an arbor shaft 54 and thus the blade 101. It also includes means shown schematically at 56 for continuously providing a fluid coolant under constant pressure to the blade cutting area via a hose 58 leading to the blade shroud 60. The saw apparatus 50 by itself as shown and described is of standard construction and forms no part of the present invention. However, as a result of the unique structure of the cutting wheel or blade 101 itself, upon supplying coolant to the cutting area during the process of cutting an abradable rock material, each gullet 116 in effect renders a very effective circulating action to the coolant in the cutting area in the manner as elsewhere described herein. This circulating action includes entrapping a substantial amount of the fluid coolant within each gullet as each such gullet enters the immediate area of the cut (i.e. the leading end of the groove being cut), and carrying the coolant from the surface of the material to that area. Thereafter each gullet as it passes from the leading end of the groove being cut entraps a substantial amount of the swarf and carrys it away from this area. On at least certain applications, it is believed the coolant and/or swarf may be caused to flow radially inwardly into a respective gullet, thus keeping the cut or groove clean of abraded material and providing a greater cooling effect to the core of the diamond-bearing cutting members.

It is to be understood that the aforedescribed preferred embodiment is not limiting but is merely illustrative of the invention, and various modifications thereof may be made by one skilled in the art without departing from the spirit and scope of the invention as defined by the appened claims.

What is claimed is:

1. A rotatable cutting wheel for wet cutting of rock or rock-like material, said cutting wheel comprising:

a circular generally disc-shaped drive core having a plurality of circumferentially extending and circumferentially-spaced support surfaces, each of said support surfaces having affixed thereto for substantially the full circumferential length thereof an abrasive cutting material means capable of cutting an abradable rock or rock-like material;

said core having a plurality of generally U-shaped gullets, each said U-shaped gullet therein being defined by the space between each adjacent pair of said support surfaces, said U-shaped gullet extending between a closed gullet end located a substantial radial distance inwardly of said support surfaces and an open gullet end being in communication with the space between said adjacent pair of said support surfaces, the circumferential width of said open gullet and being generally coextensive with the circumferential length of said space;

the ratio of said circumferential length of each said adjacent pair of said support surfaces to the circumferential length of said space being in the range of approximately 0.75 to 1.20, the total circumferential length of said support surfaces being approximately equal to the total circumferential width of said U-shaped gullets at the open end thereof, and the radial distance between the open and closed ends of each said U-shaped gullet closely approximating the circumferential width of each said open gullet end;

whereby each said U-shaped gullet and its respective space between adjacent support surfaces cooperate to define a fluid passageway having a substantial volumetric capacity through which a fluid coolant can be circulated in substantial amounts to the cutting area, can cool the drive core in the area immediately adjacent the abrasive cutting material means, and can carry away swarf therefrom.

2. A rotatable cutting wheel according to claim 1, wherein each of said support surfaces is approximately two inches in circumferential length.

3. A rotatable cutting wheel according to claim 1, wherein said abrasive cutting material means includes diamond particles held by and dispersed throughout a matrix material.

4. A rotatable cutting wheel according to claim 3, wherein said abrasive cutting material means includes a plurality of separate cutting segments, one of said cutting segments being bonded to each respective said support surface.

5. A rotatable cutting wheel according to claim 4, wherein the circumferential length of each of said cutting segments is in the range of approximately 1.25 inches to approximately 2.5 inches and the axial width thereof is slightly greater than said drive core at said support surfaces, each said cutting segment being axially centered on a respective said support surface so as to extend axially outwardly beyond the surfaces of said drive core by a substantially equal amount at either side thereof.

6. A rotatable cutting wheel according to claim 1, wherein each said U-shaped gullet is substantially symmetrical to a line radiating from the center of said core through said U-shaped gullet, said line being generally equidistant from said pair of side faces.

7. A rotatable cutting wheel according to claim 1, wherein each of said U-shaped gullets is defined in part by a pair of spaced-apart side faces at opposite sides of said space between said adjacent pair of said support surfaces, said side faces being interconnected by a generally arcuate face portion therebetween at said closed gullet end.

8. A rotatable cutting wheel according to claim 7, wherein said side faces and said arcuate face portion are substantially continuous with one another in order to form a substantially continuous U-shaped gullet face, thereby substantially minimizing stress concentrations in said drive core during said cutting of said rock or rock-like material.

9. A rotatable cutting wheel according to claim 8, wherein said generally arcuate face is substantially semi-circular in configuration.

10. A rotatable cutting wheel according to claim 9, wherein said side faces are substantially linear and substantially colinear with respective lines that are tangent to respective sides of said semi-circular arcuate face portion.

11. A rotatable cutting wheel according to claim 10, wherein said linear side faces are substantially parallel to one another and substantially parallel to a radius line equidistant from said linear faces and radiating from the center of said core through said U-shaped gullet.

12. A rotatable cutting wheel according to claim 8, wherein at least a portion of each of said side faces are arcuate in configuration, said generally U-shaped gullet being substantially symmetrical to a line radiating from the center of said core through said U-shaped gullet, said line being generally equidistant from corresponding radial locations on said side faces.

13. In combination, a machine for wet cutting of natural and artificial rock material including a rotary abrasive cutting means, means for rotating said cutting means about an axis and means for supplying a liquid coolant to said cutting means for purposes of cooling the cutting means and carrying away loose rock material from the cutting edges thereof, said cutting means including at least one circular generally disc-shaped drive core;

said drive core having a plurality of circumferentially extending and circumferentially spaced support surfaces, each of said support surfaces having affixed thereto for substantially the full circumferential length thereof an abrasive cutting material means capable of cutting an abradable rock or rock-like material;

said core having a plurality of generally U-shaped gullets, each said U-shaped gullet therein being defined by the space between each adjacent pair of said support surfaces, each said U-shaped gullet extending between a closed gullet end located a substantial radial distance inwardly of said support surfaces and an open gullet end being in communication with the space between said adjacent pair of said support surfaces, the circumferential width of said open gullet end being generally coextensive with the circumferential length of said space;

the ratio of said circumferential length of each said adjacent pair of said support surfaces to the circumferential length of said space being in the range of approximately 0.75 to 1.20, the total circumferential length of said support surfaces being approximately equal to the total circumferential width of said U-shaped gullets at the open end thereof, and the radial distance between the open and closed ends of each said U-shaped gullet being approximately equal to the circumferential width of each said open gullet end;

whereby each said U-shaped gullet and its respective space between adjacent support surfaces cooperate to define a fluid passageway having a substantial volumetric capacity through which a fluid coolant can be circulated in substantial amounts to the cutting area, can cool the drive core in the area immediately adjacent the abrasive cutting material means, and can carry away swarf therefrom.

14. The combination according to claim 13, wherein said abrasive cutting material means includes diamond particles held by and dispersed throughout a matrix material.

15. The combination according to claim 13, wherein said abrasive cutting material means comprises a plurality of separate cutting segments, one of said cutting segments being bonded to each respective said support surface.

16. The combination according to claim 15, wherein each said cutting segment is approximately two inches in circumferential length and the axial width thereof is slightly greater than said drive core at said support surfaces, each said cutting segment being axially centered on a respective said support surface so as to extend axially outwardly beyond the surfaces of said drive core by a substantially equal amount at either side thereof.

17. The combination according to claim 13, wherein each of said U-shaped gullets being defined in part by a pair of spaced-apart side faces at opposite sides of said space between said adjacent pair of said supporting surfaces, said side faces facing in generally circumferential directions toward one another and being interconnected at said closed gullet end by a generally arcuate face portion.

18. The combination according to claim 17, wherein said side faces and said arcuate face portion are substantially continuous with one another in order to form a substantially continuous U-shaped gullet face, thereby substantially minimizing stress concentrations in said drive core during said cutting of said rock or rock-like material.

19. The combination according to claim 18, wherein said side faces are substantially linear and said arcuate face portion is substantially semi-circular, said side faces being substantially colinear with lines extending tangentially from respective sides of said semi-circular arcuate face portion.

20. The combination according to claim 19, wherein said linear side faces are substantially parallel to one another and substantially parallel to a radius line extending through said axis and through said U-shaped gullet at a position equidistant from said linear side faces.

21. The combination according to claim 18, wherein at least a portion of each of said side faces is arcuate in configuration, said generally U-shaped gullet being substantially symmetrical to a line radiating from said axis through said U-shaped gullet, said line being generally equidistant from corresponding radial locations on said side faces.

22. A rotatable cutting wheel according to claim 1, wherein the circumferential length of each of said cutting segments is in the range of approximately 1.25 inches to approximately 2.5 inches.

23. A rotatable cutting wheel according to claim 2, wherein the circumferential length of each of said cutting segments is in the range of approximately 1.25 inches to approximately 2.5 inches.

* * * * *